United States Patent [19]

Slavens

[11] Patent Number: 4,525,616

[45] Date of Patent: Jun. 25, 1985

[54] INTERNAL PIPE WELDING APPARATUS

[75] Inventor: Clyde M. Slavens, Houston, Tex.

[73] Assignee: Evans Pipeline Equipment Company, Houston, Tex.

[21] Appl. No.: 567,738

[22] Filed: Jan. 3, 1984

[51] Int. Cl.³ .............................................. B23K 9/225
[52] U.S. Cl. .................................... 219/60 R; 219/66; 219/60 A
[58] Field of Search .................. 219/59.1, 60 R, 60 A, 219/61.1, 61, 66

[56] References Cited

U.S. PATENT DOCUMENTS 3,387,761  6/1968  Pickard .............................. 219/60 R
4,306,134 12/1981  Slavens et al. ..................... 219/66 X

FOREIGN PATENT DOCUMENTS

1123062  2/1962  Fed. Rep. of Germany ........ 219/66

Primary Examiner—Roy N. Envall, Jr.
Assistant Examiner—C. M. Sigda
Attorney, Agent, or Firm—Carl B. Fox, Jr.

[57] ABSTRACT

Internal pipe welding apparatus, including a pair of internal pipe clamps between which is disposed a rotative welding head support. The welding wire and gas feed conduits are disposed through passages through the central hub of one of the clamps. The welding head support is rotated by a ring gear engaged by a gear carried by a shaft disposed through a passage of the central hub of the other clamp. The gear engagement with the ring gear is adjustable to minimize vibration and chatter. The welding wire feeders are mounted on a block support at the front of the first mentioned central hub.

18 Claims, 7 Drawing Figures

INTERNAL PIPE WELDING APPARATUS

BACKGROUND OF THE DISCLOSURE

The making of internal welds at the joint between abutted pipes is a long standing problem. A number of apparatuses have been designed for this purpose, none of which is particularly satisfactory. It is often difficult to control the path of the weld bead relative the joint to prevent the weld bead from straying from the joint. Manned apparatuses, apparatuses wherein a man is placed within the pipe to control the welding, are unsatisfactory since the environment within the pipe is uncomfortable and somewhat hazardous, and since the weld emissions such as gases and hot metal particles, and the like, make placement of a man within the pipe not to be desired. If the pipes are not very large, there is not sufficient room for a man within the pipes. It is, therefore, desirable to provide an automatic internal welding apparatus which will accurately track the joint between pipe ends and form a weld reliably bridging between the pipe ends, with sufficient weld penetration that the weld is strong, and is uniform so that internal finishing of the weld is not a major problem. This invention seeks to provide an internal welding apparatus, in combination with pipe clamp apparatus, so that the welding may be done at the interior of a weld joint with control thereof at the exteriors of the pipes.

SUMMARY OF THE INVENTION

The invention provides an automatic internal welding apparatus which is controlled entirely from the exterior of the pipes to be welded together. The apparatus provides a large supply of welding wire so that access to the apparatus for installation of additional welding wire is not frequently necessary. The apparatus provides means for tracking the welding joint so that the weld formed using the apparatus is reliable and accurately bridges the seam or gap to securely weld the pipe ends together. One or more welding heads are secured to a rotatable circular plate, or disc, the welding heads being rotated over appropriate segments of the pipe periphery and slightly overlapped so that a complete weld is formed around the pipe interiors. The welding wire supplies and gas supplies for forming the weld are provided in simple straightforward manners so that there is little likelihood of equipment breakdown during welding. The plate or disc carrying the welding heads is rotated by a ring gear drive which is maintained tight so that chattering and vibration of the drive for the welding heads is avoided. The apparatus is compact, and thereby of reduced weight, making its use more convenient and less troublesome.

A principal object of the invention is to provide automatic internal pipe welding apparatus. Another object of the invention is to provide such apparatus which is compact and light in weight and simple in operation. A further object of the invention is to provide such apparatus which is dependable and economical. Yet another object of the invention is to provide such an apparatus which has multiple welding heads which may be utilized in syncronized manner to weld adjacent arcs of the pipe peripheries in any desired sequence so so as to avoid distortions caused by welding heat. Still another object of the invention is to provide such an apparatus wherein the welding tips oscillate transversely of the joint in order to more adequately bridge the joint with the weld bead. A further object of the invention is to provide such apparatus the use whereof provides a uniform weld bead not needful of excessive grinding and finishing. A still further object of the invention is to provide a welding seam tracking means which maintains the welding heads accurately centered at the seam during welding.

Other objects and advantages of the invention will appear from the following detailed description of a preferred embodiment, reference being made to the accompanying drawings.

DESCRIPTION OF THE PREFERRED EMBODIMENT

Figure 1:
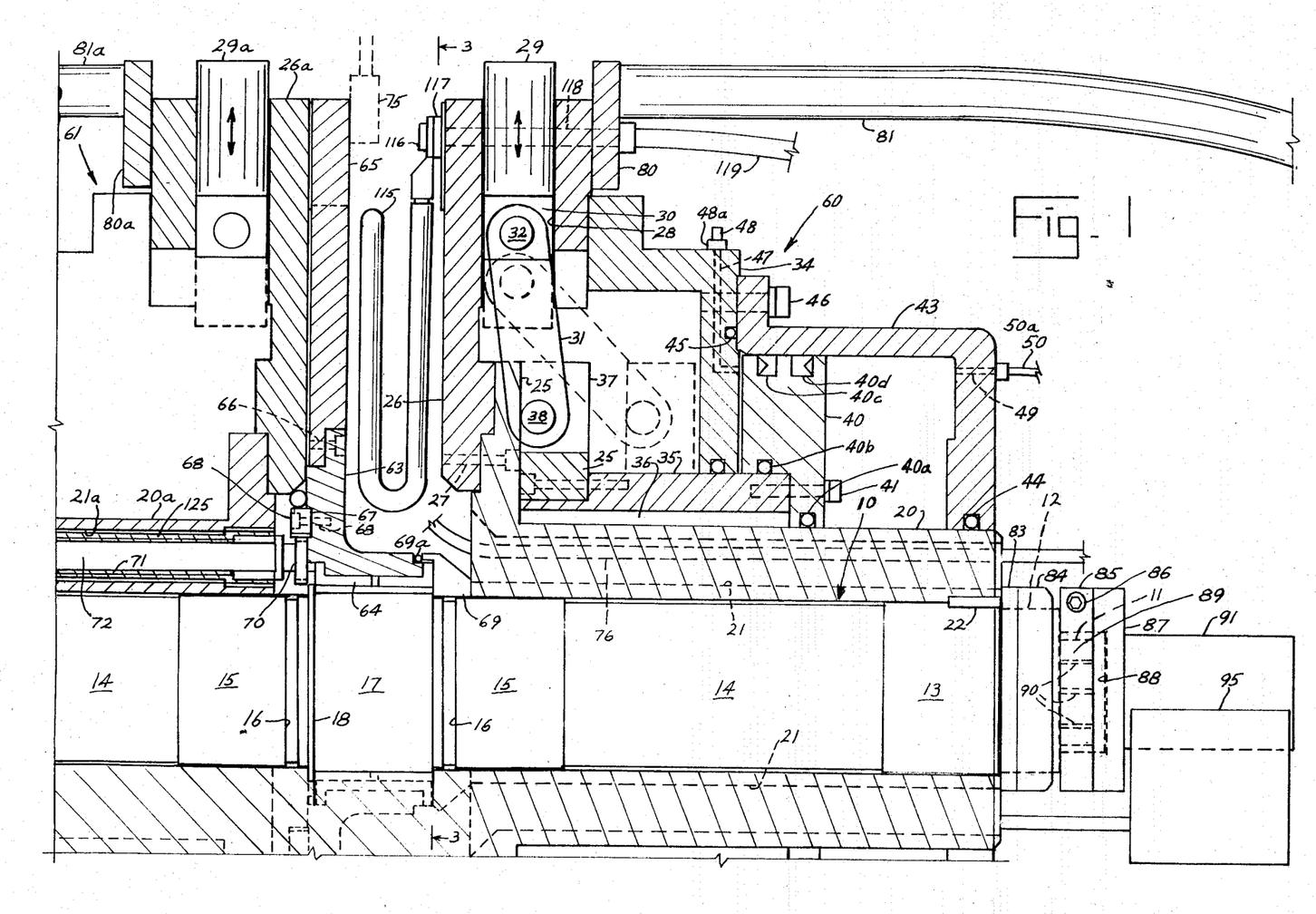
FIG. 1 is an axial cross section showing a portion of an apparatus of preferred form according to the invention.
Figure 3:
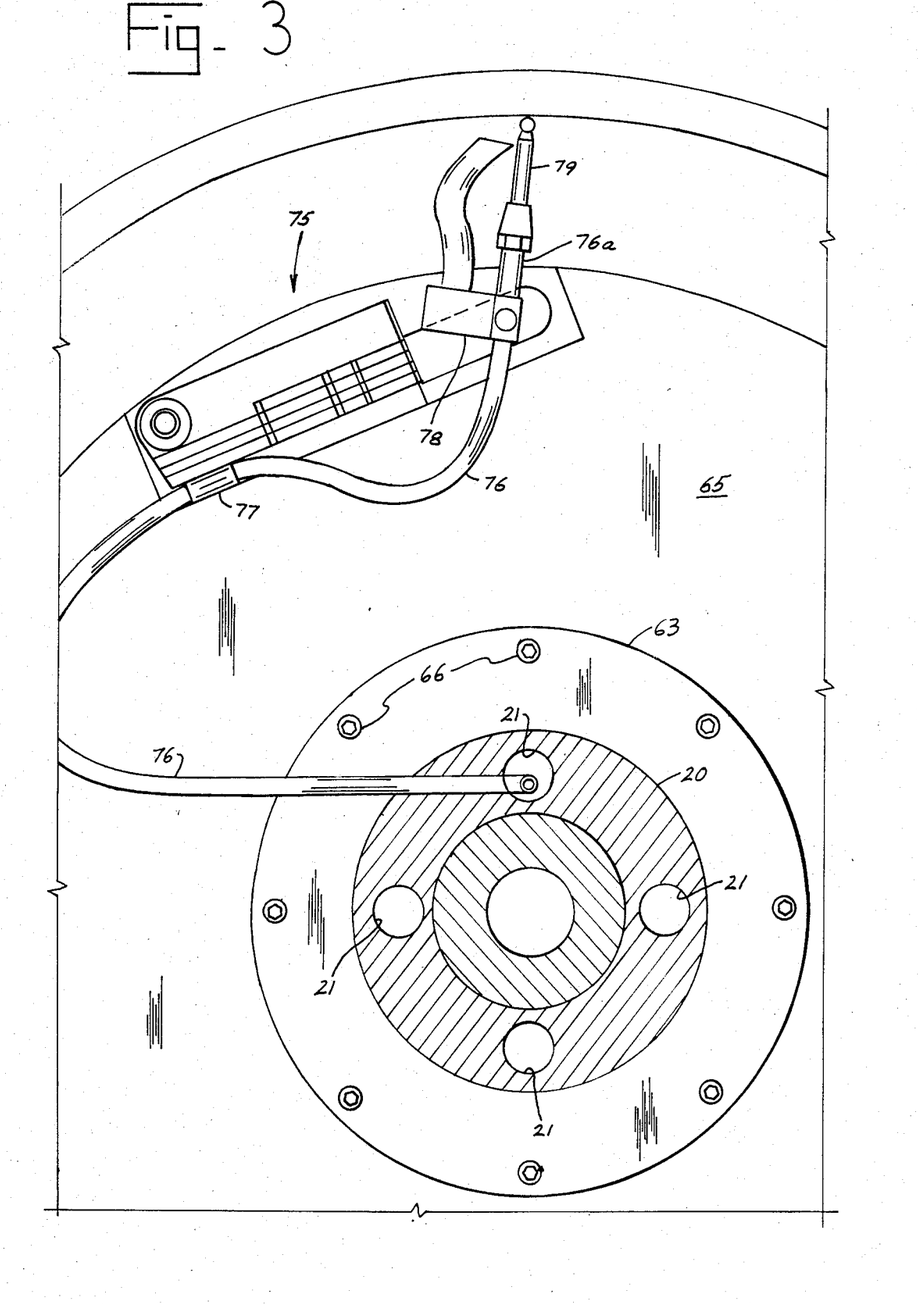
FIG. 3 is a transverse cross section taken at line 3—3 of FIG. 1.
Figure 5:
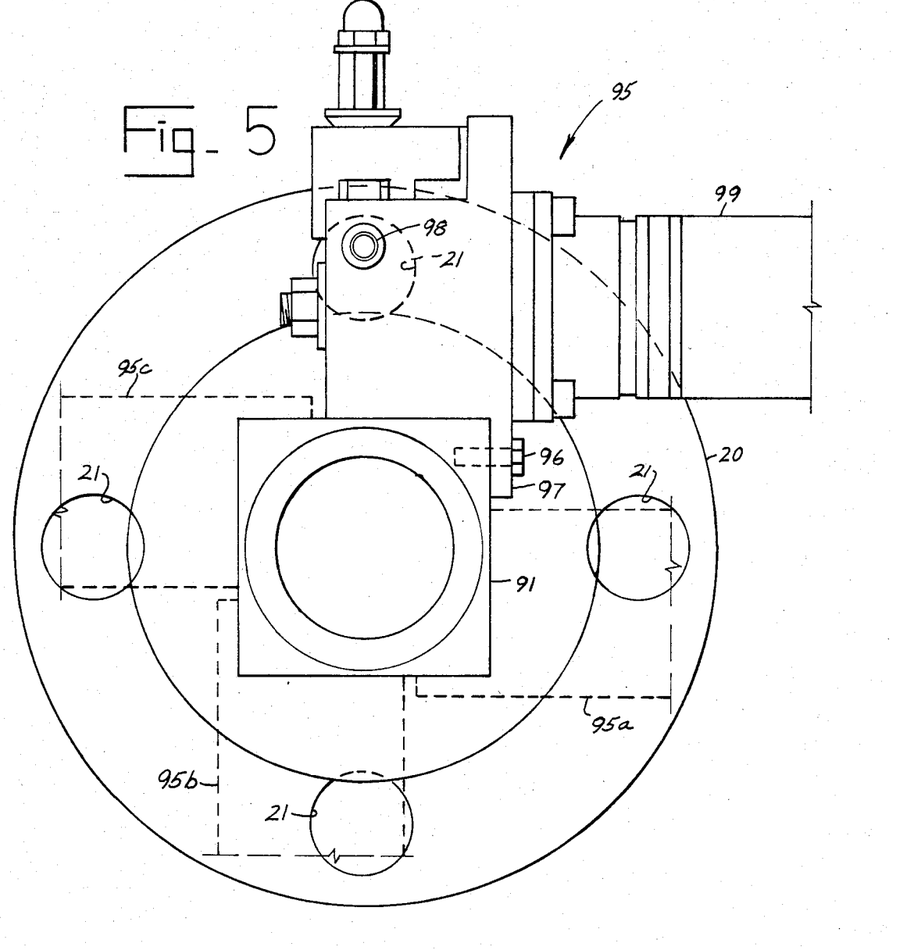
FIG. 5 is an end view of a wire feed assembly used in connection with the invention.

Referring to the drawings in detail, and first to FIG. 1, a central shaft 10 has reduced cylindrical formations 11, 11a at each end adjacent enlarged portions 12, 12a and still further enlarged portion 13. Slightly reduced portion 14 is disposed between portions 13, and 15, portions 13, and 15 being of the same diameter. A groove 16 is disposed adjacent the inner end of each shaft portion 15. A central bearing portion 17 is of outwardly enlarged diameter, and has adjacent one end an annular flange 18. A tubular hub body 20 surrounds the righthand end of shaft 10, as shown in FIG. 1. Body 20 is thickwalled and has four longitudinal passages through its wall designated by reference numerals 21, these being 90° apart as shown in FIGS. 3 and 5. A key 22 fixes body 20 against rotation on shaft 10. Body 20 has an outwardly extending annular flange 25 at its inner end, the inner face on which is stepped to receive a ring 26, which is fixed thereto by plural circularly spaced screws 27. Ring 26 has a plurality of circularly spaced radial passages 28 therethrough. A clamp shoe pin 29 is slidably disposed through each passage 28. Each pin 29 is slotted at 30 at its inner end, and a toggle bar 31 is pivotally pinned thereto by a pin 32. A cylinder support body 34, ring shaped, is disposed around a slide element 35 which has bearing sleeve 36 therewithin. Bearing 36 slides against the exterior of body 20. Each toggle bar 31 is pinned within a slot recess of ring 37 by a pin 38. An annular piston 40 is affixed to the outer end of slide 35 by a plurality of circularly spaced screws 41 and sealed by seals 40a–40d. Piston 40 is disposed within a ring shaped cylinder housing 43 of L-shaped cross section, the inner face of which is sealed at 44 around the end of body 20 and to support body 34 at seal 45. The end of cylinder housing 43 is connected to support body 34 by plural circularly spaced screws 46. A port 47 connected to a conduit 48 at fitting 48a permits fluid, liquid or gas, to be introduced and removed at the left side of piston 40 while a port 49 connected to a conduit 50 at fitting 50a permits introduction and removal of fluid at the right side of piston 40.

Conduits 48, 50 are connected to a suitable source of pressured fluid which may be introduced to either side of the piston to move the piston in the desired direction, this being well known in the art. When piston 40 is moved, slide 35 is moved along body 20 and through ring 37 causes movement of the toggle bars 31 connected to the shoe pins 29 to move the shoe pins inwardly or outwardly corresponding to the direction of piston movement. As will have been realized, the apparatus just described is an internal pipe clamp which may be set within a pipe and expanded to clamp against the pipe interior and to cause rounding of the end of a pipe within which a pipe is set. Clamp assemblies 60, 61 hold pipe ends in position to be welded together. Reference numeral 60 indicates the entire righthand clamping assembly as shown in FIG. 1, there being an identical mirror image clamping assembly 61 at the lefthand end of the apparatus, the latter being incompletely shown in the drawings and some elements of which are identified by the same reference numerals as used for clamp assembly 60.

A rotation hub 63 mounted on ring shaped bearing 64 at its interior is disposed about portion 17 of central shaft 10. A rotation plate 65, or disc, is connected around rotation hub 63 by plural circularly spaced screws 66. A ring gear 67 having internal gear teeth is connected around rotation hub 63 by plural circularly spaced screws 68. Circular plate 26a of clamp assembly 61 is disposed adjacent rotation plate 65 with a small clearance as shown. A spacer ring 69 is disposed between body 20 and rotation hub 63, and sealed to rotation hub 63 by seal 69a.

Ring gear 67 is driven in rotation by a circular gear 70. Gear 70 is mounted at the end of a shaft 72 which is disposed through passage 21a of body 20a. Shaft 72 is disposed through tubular sleeves 71, 125, the bore of sleeve 71 being eccentric. When tubular sleeve 71 is rotated, the axis of shaft 72 is moved in a circle, shifting the position of shaft 72 with respect to internal ring gear 67. This adjustment permits tightening of gear 70 against ring gear 67 so that vibration and chatter of the gear engagement may be eliminated by rotation of tubular shaft 71. Shaft 72 is driven in rotation within sleeve 71. From one to six welding heads 75 may be carried by rotation disc 65. A welding wire guide tube 76 is disposed through each of the four passages 21 of hub body 20, each tube 76 extending loosely to a welding head 75 carried by plate 65. Only one welding head 75 is shown in FIG. 3 of the drawings. As can be observed in FIG. 3, each tube 76 is clamped to a welding head 75 at a tube engaging clamp 77, the tube 76 being connected to a fixture 78 and the welding wire extending to the welding tip 79 through a wire guide 76a.

Referring back to FIG. 1, a circular ring 80 has affixed thereto circularly spaced bars 81 which are curved inwardly to be affixed at their opposite ends to a nose ring, not shown. Spools of welding wire, not shown, are supported by brackets, not shown, carried inwardly of the nose ring. The curved bar and nose ring structure is well known and widely use in the art. A set of circularly spaced bars 81a is affixed to a ring 80a at the opposite end of the apparatus. Bars 81a extend to a back end plate 133, and the back end of the apparatus is connected to a drive assembly of conventional form, not shown.

A spacer ring 83 is disposed around part 12 of center shaft 10. A threaded retainer nut 84 is screwed around part 12 of center shaft 10. An anchor ring 85 is disposed around part 11 of center shaft 10. Both elements 83 and 84 may be affixed to the center shaft, ring 83 by set screws, not shown, and nut 84 by threads.

Figure 4:
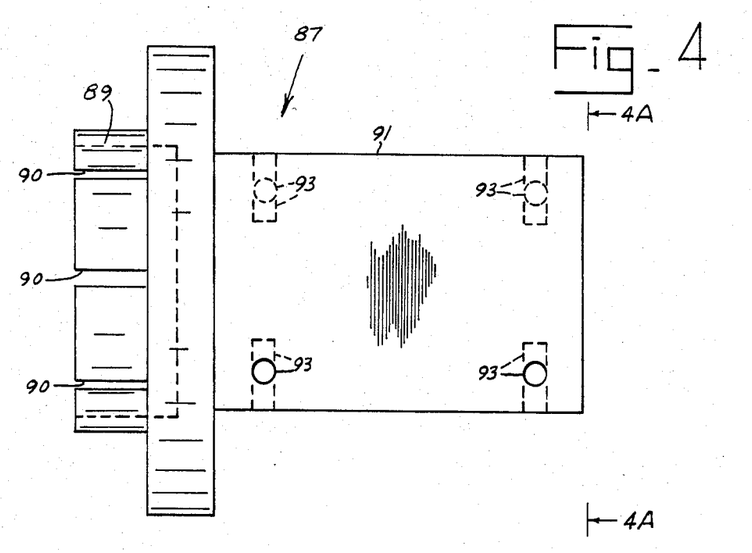
FIG. 4 is a side elevation of an element of the apparatus shown in FIG. 1.
Figure 4A:
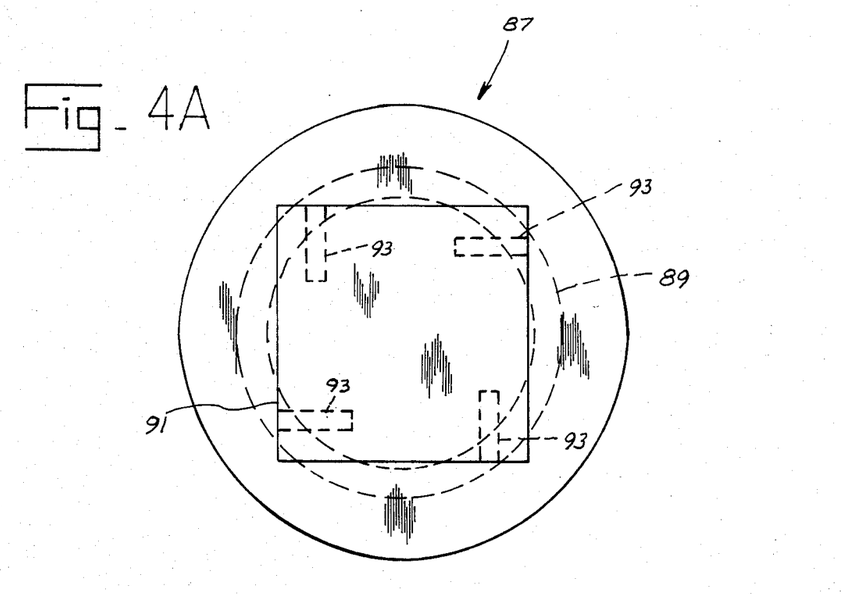
FIG. 4A is an end view of the apparatus shown in FIG. 4, taken at line 4A—4A of FIG. 4.
Figure 6:
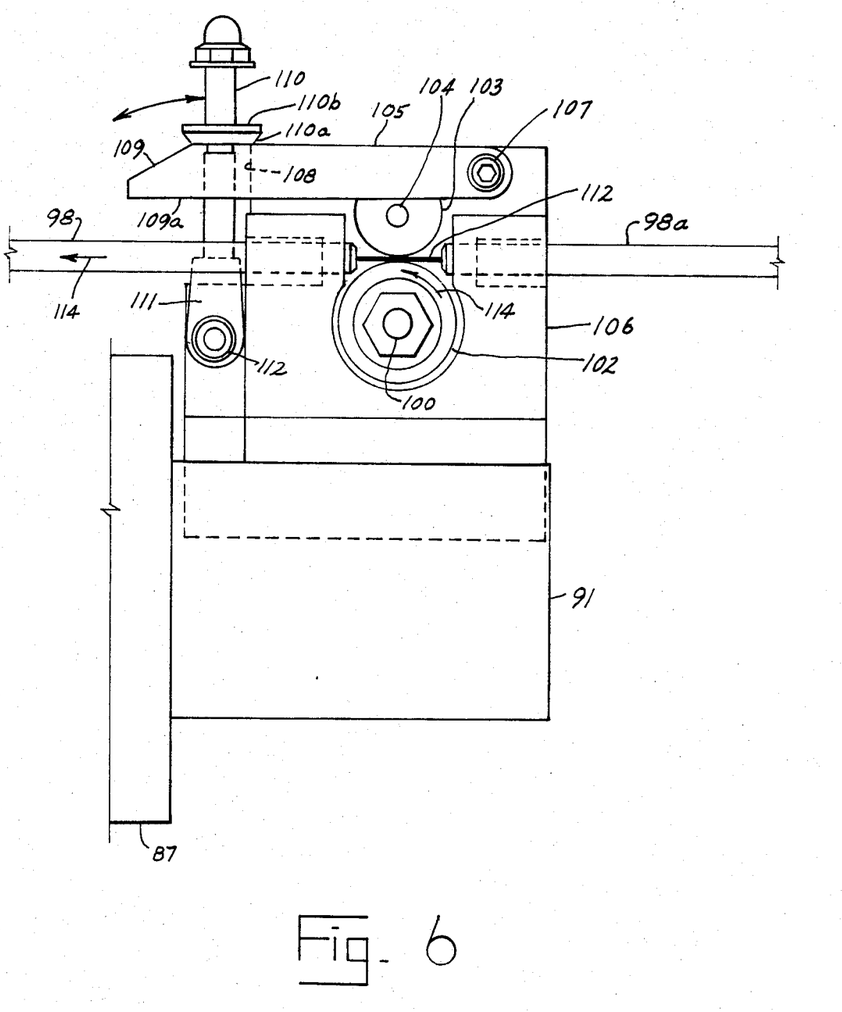
FIG. 6 is a side elevation of the apparatus shown in FIG. 5.

Ring 83 and nut 84 are disposed about portion 12 of central shaft 10. Anchor ring 85 is a split ring, the split being radially of the ring at the upper side thereof, and the ends opposite the split being connected and drawn tightly toward one another about part 11 of the central shaft by take up screw 86. Support body 87 is of circular shape and has a circular recess 88 to receive the end of part 11 of shaft 10. Support body 87 has an outwardly reduced slotted portion 89 having plural circularly spaced radial slots 90 and the slotted portion 89 is received within the central opening of ring 85 to be clamped firmly in place between shaft part 11 and ring 85. Support body 87 has an extending part 91 having square transverse cross sections. The configuration of support body 87 is made clear by reference to FIGS. 4 and 4A. To repeat, portion 89 having circularly spaced slots 90 fits closely but slidably around the end part 11 of shaft 10. The clamp ring 85 fits closely around part 89 of support body 87. When screw 86 is tightened, clamp ring 85 clamps portion 89 of support body 87 firmly to the end 11 of shaft 10. Part 91 has a pair of screw holes 93 spaced from an edge of each side, as best shown in FIGS. 4 and 4A. These screw holes are used for connection of wire feed assemblies 95 to part 91, which may be referred to as a "block". Referring now to FIG. 5, a wire feed assembly 95 is shown connected to the block 91. Two screws 96 disposed through screw holes through flange 97 are screwed into a pair of the screw holes 93. As is indicated by dashed lines showings, additional wire feed assemblies 95a, 95b, 95c may be connected to block 91 in the same manner. The wire feed tube 98 of each wire feed assembly 95 is aligned with one of the passages 21 of body 20. Each wire feed assembly (see also FIG. 6) includes a drive motor 99, preferably a servo motor on the shaft 100 of which is carried a wire drive roller 102. A pressure roller 103 mounted on shaft 104 is carried by an arm 105 pivotally mounted to the wire feed body 106 at pivot pin 107. Arm 105 has an end slot 108 and has tapered surfaces 109 at each side of the slot yoke 109a into which a screw 110 may be slidingly moved at beveled surface 110a of nut 110b. Screw 110 is screwed into a pivotal mount 111 rotatable about pin or shaft 112 so that the screw 110 may be moved to the left as shown in FIG. 6 out of slot 108 so that arm 105 may be pivotally elevated to separate pressure roller 103 from wire drive roller 102. Two portions of wire guide tube 98 are shown, one being shown as tube 98a. The welding wire 112 is pulled from a wire spool rotatably supported by brackets depending from the nose ring, as before stated, and enters through tube 98a which is fixed into the side of body 106. The welding wire passing between rollers 102, 103 is moved upon operation of motor 99 and rotation of roller 102 in the direction of arrow 114 and with the pressure and drive rollers disposed against the opposite sides of wire 112. The wire is delivered through guide tube 98, which extends, as shown in FIG. 1, through a passage 21 through body 20 into the space between clamp assemblies 60 and 61. It will be noted that wire drive roller 102 is mounted directly onto the shaft of servo motor 99 so that no gearing or other driving mechanism is required within wire feed body 106. Wire feed body 106 is hollowed to receive the drive roller and pressure roller as shown. The wire feed assembly is simple and uncomplicated, and provides direct drive of the welding wire into the internal pipe welding apparatus.

It will be clear that four wire feed assemblies may be mounted about block 91 with a welding wire guide tube 98 disposed through each passage 21 of body 20, each leading to a welding head 75 as shown in FIG. 3. Referring to FIG. 1, a welding current cable 115 is shown within the space between clamp assemblies 60, 61. Cable 115 is connected by a bolt 116 to a terminal 117 mounted on the side of ring or plate 26. A conduit 118 is disposed through suitable openings through body 26 and plate 80 and connected by cable 119 to a source of welding current. Cable 115 is provided with slack in the form of a U-bend in order that the welding head may reciprocate within the space between clamps 60, 61 in the same manner that the tube 76 is movable in said space.

It should now be pointed out that the welding heads move only through approximately 90° arcs. In their 90° movements, the welding heads move approximately 45° to each side of the openings 21 in body 20, so that the cables and tubes extending to the welding heads are not overstressed or strained and will have long operating lives.

Figure 2:
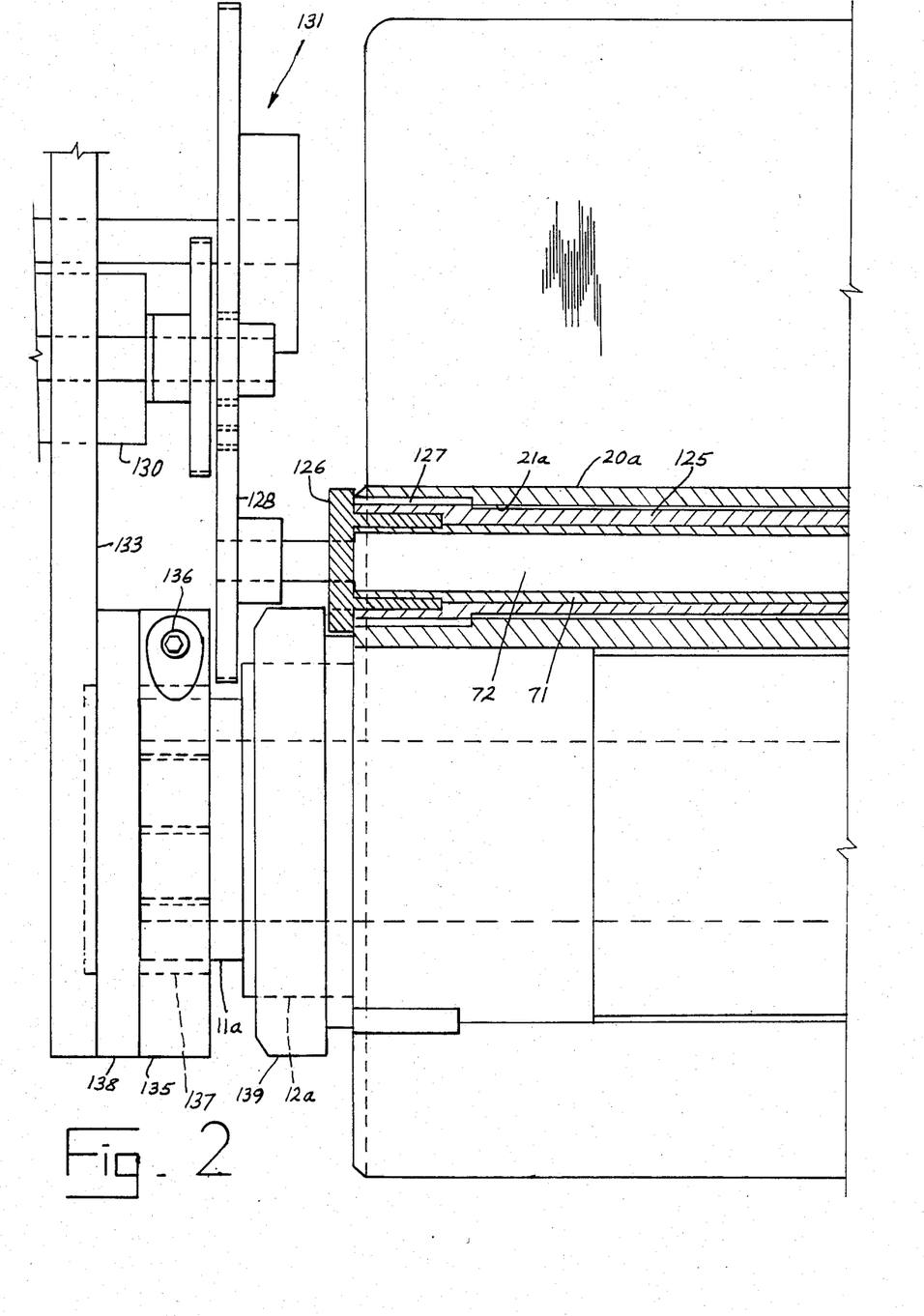
FIG. 2 is an axial cross section showing the remainder of the apparatus shown in FIG. 1.

In FIG. 2 of the drawings, a portion of the lefthand end of the apparatus shown in FIG. 1 is shown, enlarged. Hub body 20a has a longitudinal passage 21a through its wall, from end-to-end. A liner sleeve 125 is disposed within passage 21a. A sleeve 71, previously mentioned, is disposed within sleeve 125. A shaft 72, previously mentioned, is disposed within sleeve 71. An end cap 126 is fixed to the lefthand end of sleeve 71, as shown in FIG. 2. A bearing 127 surrounds the end of shaft 72. The tube 71 has an eccentric passage therethrough. Therefore, when tube 71 is rotated by rotation of end cap 126 the axis of shaft 72 is moved in a circle and gear 70 at the other end of shaft 72 is position adjusted with respect to internal ring gear 67. Therefore, the gear 70 can be tightened against ring gear 67 so that vibration and chatter at the gear engagement will not occur.

The lefthand end of shaft 72 is reduced, FIG. 2, and gear 128 is mounted on the end of shaft 72. Servo motor 130 drives gear 128 through gear train 131, all elements of which are not clearly shown in FIG. 2, but the function of which will be well understood by those skilled in the art. Upon operation of servo motor 130, shaft 72 is rotated to rotate gear 70 to rotate ring gear 67. Ring gear 67 is fixed to rotation hub 63 by plural circularly spaced screws 68. When rotation hub 63 is rotated, plate 65 supporting the welding heads 75 is rotated. Motor 130 is a reversible electric motor, so that the welding heads 75 may be rotated in either direction.

A clamp ring 135, which has a radial split at its upper side and is tightened by tightening of connecting screw 136 to shaft end 11a, holds the split annular portion 137 (like portion 89 of support body 87, FIG. 1) of ring 138 clamped to shaft end 11a. Threaded nut 139 is disposed about portion 12a of shaft 10, portion 12a being threaded and of a diameter intermediate the full diameter of shaft 11a and the diameter of end portion 11a.

It will now be clear that the apparatus herein described is a distinct improvement over the prior art. An apparatus is provided which will reliably rotate up to four welding heads over 90° arcs of the weld seam of end abutted pipes. As has become customary in the art, welding is accomplished by welding one-fourth arcs of the seam circumference while moving two opposite welding heads in 90° movements in one direction, and then reversing the welding head rotational direction and welding the remainder of the bead with the remaining two welding heads. This procedure reduces heat distortion of the pipes. The welding heads are accurately held on track to coincide with the location of the welding gap between the pipe ends, and the service lines, the welding wire guide tubes and the electrical supply cables are not overstressed, being moved only 45° to each side of center for a 90° pass around the pipes.

While four passages 21, welding heads 75, and wire feeders are shown, any number such as one, two, four, or six may be provided, with consequent changes in the angles therebetween and the welding arc segments. Easy access to the welding and supply elements is provided, as the welding wire passes through the passages 21 in locations easily accessible from the exterior of the apparatus. The welding current cable is affixed at the fixture 117, also easily accessible from the exterior of the apparatus. The welding heads themselves on plate 65 are readily accessible for repair or exchange should conditions warrant. The clamp structures 60, 61 are of conventional design well understood by trained operators in the art, and are easily operated by relatively unskilled personnel. They are reliable in operation and not subject to frequent failure. The clamp structures are reduced in size as compared with conventional structures and are therefore of reduced weight and lower cost.

While preferred embodiments of the invention has been described and shown in the drawings, many modifications thereof may be made by a person skilled in the art without departing from the spirit of the invention, and it is intended to protect by Letters Patent all forms of the invention falling within the scope of the following claims.

I claim:

1. Internal pipe welding apparatus, comprising central shaft means, a pair of non-rotatable tubular hub means each disposed around a different end of said central shaft means, each said hub means including a central passage and wall means surrounding said central passage, one of said hub means having a plurality of circularly spaced passages through its said wall from end to end radially outwardly of and parallel to its said central passage, transverse plate means mounted rotatably around said central shaft means between the inner ends of said hub means, means for rotating said transverse plate means about said central shaft means, and at least one welding head means carried by said transverse plate means and rotatable therewith about said central shaft means, whereby said welding heads may be moved along the abutment between two abutted pipe ends to weld said pipe ends together at their interiors.

2. The combination of claim 1, wherein said transverse plate means is circular and has a circular central opening through which said central shaft means is disposed.

3. The combination of claim 2, wherein said central shaft means is tubular.

4. The combination of claim 3, including means for maintaining operation of said welding heads extending to said welding heads through said passages through said hub wall.

5. The combination of claim 4, said apparatus including internal pipe clamp means at each side of said transverse plate means.

6. The combination of claim 5, including an interior ring gear fixed concentrically around said transverse plate means of said central shaft means, and gear drive means engaging said interior ring gear for driving said transverse plate means in rotation about said central shaft means.

7. The combination of claim 6, said gear drive means comprising a cylindrical passage through the wall of the other of said hub means outwardly of and parallel to its central passage, a drive shaft disposed rotatably through said cylindrical passage, a circular gear carried at the inner end of said drive shaft engaging said interior ring gear, drive motor and gear means for driving said drive shaft in rotation at the outer end of said drive shaft.

8. The combination of claim 7, said drive shaft having adjustment sleeve means having an eccentric bore thereabout in said cylindrical passage, whereby by rotation of said adjustment sleeve means said circular gear may be moved more tightly or less tightly against said interior ring gear to adjust its engagement therewith.

9. The combination of claim 8, including a fitting having a concentric block of square transverse cross section fixed to the outer end of said one hub means, and at least one welding wire feed assembly fixed to said block for delivering welding wire through a said hub passage to a said welding head.

10. The combination of claim 9, said drive motor being a reversible electric motor so that said transverse plate may be rotated in either direction of rotation.

11. Internal pipe welding apparatus for welding around the seam between pipes abutted end-to-end, comprising a pair of internal pipe clamp means for engaging the interiors of a pair of pipes each having a surrounding wall abutted end-to-end for welding, each said pipe clamp means including a non-rotatable tubular hub mounted around a central shaft, at least one passage through the wall of one of said tubular hubs parallel to said central shaft, a welding head support carrying at least one welding head adjacent the interior of said seam rotatably mounted around said central shaft between said pipe clamp means, drive means disposed through a drive means passage through the other of said tubular hubs for driving said welding head support in rotation about said central shaft.

12. The combination of claim 11, said welding head support comprising a circular plate disposed for rotation concentrically about said central shaft and having an internal ring gear fixed concentrically therearound, said drive means including a drive shaft disposed through said drive means passage having a circular gear at its inner end engaged with said internal ring gear, said drive shaft having a drive gear fixed to its outer end, said drive gear being engaged with a gear train, a reversible electric motor disposed to drive said gear train to drive said drive shaft and said circular plate in rotation in either direction of rotation so that said welding heads carried by said circular plate may be moved around the interior of said seam in either direction of rotation.

13. The combination of claim 12, said drive shaft being disposed through an eccentric sleeve lining said drive means passage whereby when said eccentric sleeve is rotated the position of said drive shaft and said circular gear with respect to said interior ring gear is adjusted.

14. The combination of claim 13, said electric motor being a servo motor.

15. The combination of claim 13, including a block of square transverse cross section being mounted concentrically at the outer end of said one tubular hub, at least one welding wire feed assembly being supported by said block and the welding wire fed thereby being delivered through one said passage of said one tubular hub and extending to a said welding head supported by said circular plate to be used in welding said seam.

16. The combination of claim 15, there being a plurality of said welding heads supported circularly spaced by said circular plate, opposite said welding heads being used to weld opposite segments of said seam with said circular plate being rotated in one direction and opposite others of said welding heads then being used to weld remaining segments of said seam with said circular plate being rotated in the opposite direction.

17. The combination of claim 16, there being plural welding wire feed assemblies being supported by said block and the welding wire fed by each being delivered through a said passage of said one tubular hub to a different one of said welding heads.

18. The combination of claim 17, including a welding current flowpath being provided through one said internal pipe clamp means for each said welding head and being connected to the welding head by a slack cable whereby said circular plate may be rotated in opposite rotations from a neutral rotational position.

* * * * *